United States Patent Office 2,776,268
Patented Jan. 1, 1957

2,776,268

LEATHER PASTE POLISH CONTAINING WAX AND A MONOGLYCERIDE

Elliott Morrill and Richard G. Landwerlen, Indianapolis, Ind., assignors to The Best Foods, Inc., New York, N. Y., a corporation of New Jersey No Drawing. Application October 18, 1952, Serial No. 315,582

10 Claims. (Cl. 260—23)

The present invention relates to wax paste polishes and more particularly, to wax paste polishes for shoes and leather goods and to a novel process for producing the same.

Shoe and leather paste polishes have been on the market for many years and are manufactured and sold by a number of manufacturers for professional and home use. However, these paste polishes suffer from one or more disadvantages. These polishes either require vigorous physical effort to obtain a durable clear gloss or shine on shoes and leather goods, or they fail to satisfactorily stain the leather sufficiently to cover abrasion or scuff marks and thus remove blemishes on the leather. These polishes require brushing, buffing and rubbing to develop gloss and shine and most do not give a clear or "mirror-like" gloss even after great physical effort. The deficiency of staining power of some of these present polishes is particularly disadvantageous in the cases of well worn and scuffed leather and shoes.

Additionally, many of the paste polishes, prior to the present invention, suffered from surface blooming and shrinkage of the paste cake in the containers. The latter is caused by excessive evaporation of the solvent. Others suffer from syneresis, i. e., leaking or bleeding of the solvent from the paste polish, and fail to retain their gel-like structure.

The wax paste polishes of the present invention overcome the disadvantages inherent to the polishes of the prior art. The novel polishes have superior staining properties and will mask blemishes of even the most worn and scuffed leather. The shine produced is of an excellent quality and is of a clear gloss or shine which is long-lasting. The novel polishes are spread easily and evenly over the leather surfaces in a uniform continuous wax film. The polishes themselves are excellent in their appearance having a clear luster free from murkiness and haziness. What is perhaps of primary importance to the consumer is the ease with which the polishing of the surface is effected. Upon only the lightest of polishing action an excellent clear, long-lasting shine is produced. This permits the average consumer to shine his shoes to a finish which compares favorably with that of a professional, while expending only a fraction of the physical effort.

The wax paste polishes of the present invention are superior in their physical and chemical properties. They are resistant to surface blooming, shrinkage of the paste cake in the container and to syneresis. Thus, they have an attractive physical appearance which is so important from the viewpoint of the consumer. The polishes of the invention also have the desirable property of setting into a hard cake almost immediately upon pouring the molten paste into the container and cooling.

It is an object of the invention to provide a novel wax paste polish that will impart a long-lasting clear gloss or shine to shoes and leather goods with a minimum of polishing or rubbing.

It is another object of the invention to provide a novel wax paste polish that will spread easily and evenly on both smooth and rough leather surfaces.

It is an additional object of the invention to provide a wax paste polish which has an attractive appearance free from irregularities, and which is clear and free of haze.

It is a further object of the invention to provide a novel wax paste polish producing a high degree of solubilization of those dyestuffs designated by the dyestuffs industry as "spirit soluble" dyestuffs, which are normally soluble in alcohol but insoluble in hydrocarbon solvents, so as to impart enhanced color-staining properties. The high degree of solubilization of the dye prevents streaking of the dye on the surface of the leather during application of the polish. "Dye-streaking" is a fault quite common among the paste polishes of the prior art, and its prevention is one of the advantages of the paste polishes of the invention.

Other objects will be apparent to those skilled in the art upon reading the specification which follows.

In accordance with this invention, there is provided a novel wax paste polish comprising a wax or mixture of waxes of vegetable, animal or mineral sources; a hydrocarbon solvent; a thermoplastic synthetic resin which is soluble in aliphatic and aromatic hydrocarbon solvents; a fatty acid ester of an aliphatic polyhydric alcohol in which the ester has at least two free hydroxyl groups, the fatty acids composing the ester should preferably have at least 12 carbon atoms and usually not more than 20 carbon atoms. The paste shall contain optionally coal-tar dyestuffs to impart stain to the leather. Additionally, for preferred results, the paste polish may contain an organic phosphatide, such as the lecithins produced from vegetable oils, such as corn oil, soya bean oil and animal sources, such as eggs. Also, other materials may be incorporated into the paste as desired.

The mechanism through which the thermoplastic synthetic resin, fatty acid ester and optionally the phosphatide cooperate to produce the unique properties of the paste is not entirely understood. However, the resin and ester are critical components of the paste polish. If one of these components is omitted the resulting paste polish does not have the properties which are unique to the present invention.

The preferred compositions in accordance with the present invention may vary within broad limits insofar as the ingredients other than the fatty acid ester and the thermoplastic synthetic resin are concerned. However, the fatty acid ester should preferably comprise from 1% to 5% by weight of the total composition; with 2% to 2.75% the preferred range. Optimum results are obtained with about 2.25% of ester. The thermoplastic synthetic resin should preferably comprise from 2% to 15% by weight of the mass. Best results are obtained with 2% to 5% of the resin and optimum results with about 3% of the resin. The phosphatide, or lecithin, when present, should comprise from 0.03% to 1.0% by weight of the mass.

The fatty acid esters contemplated for use in the invention are those of polyhydric alcohols in which the resulting ester shall have two or more free hydroxyl groups. Among the polyhydric alcohols which may be used are a hexahydric alcohol, such as sorbitol, and mannitol, or a trihydric alcohol, such as glycerine, or other polyhydric alcohols containing at least 3 hydroxyl groups. The fatty acids forming part of the ester should contain at least 12 carbon atoms and preferably a maximum of 20 carbon atoms. Examples of the esters which may be used are the monoglycerides of corn oil, lard, soya bean oil, tallow, mixed corn and soya bean oils, stearic acid, palmitic acid, oleic acid, linoleic acid and ricinoleic acid and mixtures of these acids. Representative of the esters of the hexahydric alcohols are mannitan monopalmitate, sorbitan monostearate and mannitan monolaurate. From results obtained thus far it appears that mono-esters are more satisfactory than the di-esters. The preferred esters are those of glycerine, or the mono-glycerides.

The monoglycerides are usually prepared by hydrolyzing the naturally-occurring triglycerides with glycerine and an alkali under appropriate conditions to hydrolyze two of the ester groups. The resulting product is usually contaminated with appreciable amounts of di- and triglycerides, as well as soap and free fatty acids. These by-products are undesirable and deleterious to obtaining a paste polish with the superior properties of the present invention. Accordingly, it is advantageous to purify the monoglyceride to remove these by-products. A convenient method for accomplishing purification is by molecular distillation. The most desirable ester for use in the invention is glyceryl monostearate, commonly known as monostearin. Commercial monostearin is usually 40% to 55% glyceryl monostearate. For best results, it is contemplated that the molecularly distilled monostearin, which is 90-95% pure shall be used. This highly pure monostearin, when incorporated into the paste polish with the phosphatide and the thermoplastic synthetic resin, makes it possible to incorporate spirit soluble dyestuffs into the paste polish whereas this is impossible in the paste polishes of the prior art. It appears that these insoluble dyes are solubilized, for it is noted that the dyestuff color is imparted to polishing cloths used. This is not possible with the polishes of the prior art and explains in part the enhanced scuff-removing and high tinctorial properties of the paste polishes of the invention.

The thermoplastic synthetic resins are a well known class of materials to those skilled in the art. They are distinguished from the thermosetting synthetic resins, which have been found unsatisfactory in the paste polishes of the invention. It is highly important that the thermoplastic resin be soluble in aliphatic and aromatic hydrocarbon solvents, such as the turpentines and mineral spirits, and yet it must also be compatible with the waxes used. The preferred thermoplastic synthetic resins for use in the composition of the invention are those low molecular weight resins produced by the Pennsylvania Industrial Chemical Corporation, designated as "Piccolastic resins A-50 and A-75," which are polymers of styrene and its homologues, the Piccolyte resins, which are polymers of beta-pinene; para-coumarone-indene resins, sold under the trademark "Cumar-W" by the Barrett Divison of Allied Chemical and Dye Corporation; and that produced by Durez Plastics and Chemicals, Inc., under the designation, "Durez #219," which is a thermoplastic terpene phenolic resin. The latter provides optimum results. The Piccolastic resins A-50 and A-75 are produced by polymerizing crude mixtures of styrene and its homologues obtained from coke ovens and gas house by-products. Those polymers melting at 50° C. and 75° C. are preferred as they combine with the waxes in the paste polish in producing an excellent polish finish. The Durez #219 resin is a terpene-phenolic oil-soluble, high-melting, low-viscosity thermoplastic resin having a melting point of approximately 152±4° C.

The organic phosphatides are also a well known class of materials. This material, more commonly known as the lecithins, may be obtained from many of the vegetable oils, such as corn and soya bean oil, and from animal products, such as eggs. The lecithin may be recovered from the oils by precipitating with the addition of water. Soya bean oil lecithin is most commonly used.

Wax paste polishes utilize the waxes for their polishing properties and their ability to preserve leather. Waxes, and mixtures of waxes of animal, vegetable and mineral (petroleum) sources may be used. Such waxes are carnauba, ouricury, candelilla, montan, sugar-cane, beeswax and paraffin waxes. These waxes normally comprise between 20% to 30% of the paste polish, although other quantities may be used.

A solvent is necessary to dissolve and disperse the waxes, dyes, thermoplastic synthetic resin, etc. into a uniform paste polish. These solvents are usually hydrocarbons and may be from vegetable sources, such as the turpentines, or from a mineral source, such as the petroleum hydrocarbon solvents, known as mineral spirits, such as cleaner's naphtha, Stoddard solvent and very light mineral oil. The preferred mineral spirit for use in the invention is the Stoddard solvent having an initial boiling point of approximately 151-155° C., boiling to an upper limit of 198° to 202° C. This material has a specific gravity of from 0.7795 to 0.7810 at 15.5/15.5° C. The turpentines are mixtures of terpenes having the general formula $C_{10}H_{16}$. Pinene is the chief component. The term "turpentines" encompasses various members of the terpene family, including gum spirits of turpentine, sulfate wood turpentine, steam-distilled turpentine, alpha pinene, beta pinene, dipentene, and para-cymene. Of the turpentines, the preferred solvents are sulfate wood turpentine, gum spirits of turpentine and alpha pinene and mixtures thereof. These hydrocarbon solvents should preferably have a boiling point of between 50° and 250° C.

The present invention also comprises the novel process for preparing the wax paste polishes of the present invention. The process is simple in nature and does not require complicated or expensive equipment. In general, according to the process, the waxes and the fatty acid ester of the polyhydric alcohol are melted together with stirring in a jacketed kettle. The coal-tar dyestuffs are then added to the melted waxes. The mixture is then heated to 104-121° C. with continuous stirring. The mixture is cooled to 90-93° C. and the phosphatide, when it is to be utilized, is added. Cooling is continued until the mixture reaches 80-83° C., stirring the mixture continuously during the cooling. In a separate vessel, the thermoplastic synthetic resin is dissolved in the hydrocarbon solvent with the aid of heat and stirring. The solution is heated to 70-73° C. and stirring continued until all of the resin is in the solution, after which the solution is cooled to 20-25° C. The solution of the thermoplastic synthetic resin in the hydrocarbon solvent is then added to the wax mixture while stirring constantly. It is important to add the resin-solvent solution to the wax mixture at such a rate of addition that the temperature resulting when all of the resin-solvent is added will be within the range of 43-52° C. After the batch is mixed, the whole mass is heated, while stirring, to 52-57° C. and is then ready for pouring into containers. The poured paste "sets" promptly upon cooling into a stiff, clear shiny paste.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims. The method of preparation used in the examples which follow is that described above.

*Example 1*

| | Percent |
|---|---|
| Carnauba wax #3 | 5.00 |
| Ouricury wax | 3.50 |
| Candelilla wax | 8.25 |
| Paraffin wax (130-135° F. M. P.) | 10.00 |
| Mono-glyceride of stearic acid (90% pure) | 2.25 |
| Thermoplastic terpene phenolic resin (Durez #219) | 3.00 |
| Sulfate wood turpentine | 30.30 |
| Mineral spirits | 34.72 |
| Nitrobenzene | 0.25 |
| Soya lecithin | 0.03 |
| Spirit soluble Nigrosine SSB ("colour index" 864) | 2.70 |
| | 100.00 |

Example 2

| | Percent |
|---|---|
| Carnauba wax #3 | 5.00 |
| Ouricury wax | 4.00 |
| Candelilla wax | 8.25 |
| Paraffin wax (130–135° F. M. P.) | 8.00 |
| Mono-glyceride of stearic acid | 3.75 |
| Thermoplastic terpene phenolic resin (Durez #219) | 3.00 |
| Sulfate wood turpentine | 64.00 |
| Soya lecithin | 1.00 |
| Spirit soluble Nigrosine SSB ("colour index" 864) | 3.00 |
| | 100.00 |

Example 3

| | Percent |
|---|---|
| Carnauba wax #3 | 5.00 |
| Ouricury wax | 4.00 |
| Candelilla wax | 7.25 |
| Paraffin wax (130–135° F. M. P.) | 10.00 |
| Mono-glyceride of mixed soya and corn oil fatty acids | 2.75 |
| Thermoplastic terpene phenolic resin (Durez #219) | 3.00 |
| Sulfate wood turpentine | 66.85 |
| Nitrobenzene | 0.25 |
| Soya lecithin | 0.30 |
| Oil Brown Y (an azo dye having no water-soluble groups) | 0.50 |
| Sudan Orange RRA | 0.10 |
| | 100.00 |

Example 4

| | Percent |
|---|---|
| Carnauba wax #3 | 4.00 |
| Ouricury wax | 3.20 |
| Candelilla wax | 6.40 |
| Paraffin wax (130–135° F. M. P.) | 8.00 |
| Mono-glyceride of stearic acid | 5.00 |
| Polystyrene resin (Piccolastic A–50) | 15.00 |
| Sulfate wood turpentine | 56.60 |
| Soya lecithin | 0.30 |
| Sudan Orange RRA | 0.20 |
| Sudan Corinth 3B | 0.50 |
| Sudan Yellow RRA | 0.80 |
| | 100.00 |

Example 5

| | Percent |
|---|---|
| Carnauba wax #3 | 5.25 |
| Ouricury wax | 1.50 |
| Candelilla wax | 7.25 |
| Montan wax | 2.00 |
| Sugar cane wax | 3.00 |
| Paraffin wax (130–135° F. M. P.) | 10.00 |
| Mono-glycerine of stearic acid | 1.00 |
| Thermoplastic terpene phenolic resin (Durez #219) | 3.00 |
| Sulfate wood turpentine | 63.50 |
| Lecithin | 0.50 |
| Spirit soluble Nigrosine SSB ("colour index" 864) | 3.00 |
| | 100.00 |

Example 6

| | Percent |
|---|---|
| Carnauba wax #3 | 5.00 |
| Ouricury wax | 3.50 |
| Candelilla wax | 8.25 |
| Mono-glyceride of stearic acid (90% pure) | 2.25 |
| Paraffin wax (130–135° F. M. P.) | 10.00 |
| Para-coumarone-indene resin ("Cumar W½") | 3.00 |
| Sudan Orange RRA | 0.15 |
| Sudan Corinth 3B | 0.35 |
| Sudan Yellow RRA | 0.50 |
| Oil of Myrbane | 0.25 |
| Sulfate wood turpentine | 30.00 |
| Mineral spirits | 36.75 |
| | 100.00 |

Paste polishes without a dye may be prepared which have the unique polishing properties of the invention. The following is an example of such a preparation.

Example 7

| | Percent |
|---|---|
| Carnauba wax #1 | 5.00 |
| Ouricury wax | 3.50 |
| Candelilla wax | 8.25 |
| Paraffin wax (130–135° F. M. P.) | 10.00 |
| Mono-glyceride of stearic acid | 2.25 |
| Thermoplastic terpene phenolic resin (Durez #219) | 3.00 |
| Sulfate wood turpentine | 30.00 |
| Lecithin | 0.50 |
| Nitrobenzene | 0.25 |
| Mineral spirits | 37.25 |
| | 100.00 |

The terms and expressions employed are used as terms of description and not of limitation, and it is not intended, in the use of such terms and expressions, to exclude any equivalents of the features shown and described or portions thereof, but recognize that various modifications are possible within the scope of the invention claimed.

What is claimed is:

1. A wax paste polish comprising about 20 to about 30% of a mixture of waxes, said wax mixture containing about 30 to about 45% mineral waxes, a hydrocarbon solvent, about 1 to about 5% of an acid ester of a polyhydric alcohol containing at least two free hydroxyl groups in the alcohol residue thereof and a fatty acid containing at least 12 carbon atoms and about 2 to about 15% of a thermoplastic synthetic resin soluble in said hydrocarbon solvent and selected from the group consisting of beta pinene resins, terpene phenolic resins, coumarone-indene resins and polystyrene resins.

2. A wax paste polish comprising about 20 to about 30% of a mixture of waxes, said wax mixture containing about 30 to about 45% mineral waxes, a hydrocarbon solvent, about 1 to about 5% of a monoglyceride of a fatty acid containing at least 12 carbon atoms and about 2 to about 15% of a thermoplastic synthetic resin soluble in said hydrocarbon solvent and selected from the group consisting of beta pinene resins, terpene phenolic resins, coumarone-indene resins and polystyrene resins.

3. A wax paste polish comprising about 20 to about 30% of a mixture of waxes, said wax mixture containing about 30 to about 45% mineral waxes, a hydrocarbon solvent, about 1 to about 5% of a monostearin of at least 90% purity and about 2 to about 15% of a thermoplastic synthetic resin soluble in said hydrocarbon solvent and selected from the group consisting of beta pinene resins, terpene phenolic resins, coumarone-indene resins and polystyrene resins.

4. A wax paste polish comprising about 20 to about 30% of a mixture of waxes, said wax mixture containing about 30 to about 45% mineral waxes, a hydrocarbon solvent selected from the group consisting of turpentines and mineral spirits, about 1 to about 5% of a fatty acid ester of a polyhydric alcohol containing at least two free hydroxyl groups in the alcohol residue and the fatty acid substituent having at least 12 carbon atoms, about 2 to about 15% of a thermoplastic synthetic resin soluble in said hydrocarbon solvent and selected from the group consisting of beta pinene resins, terpene phenolic resins, coumarone-indene resins and polystyrene resins, and a phosphatide.

5. A wax paste polish comprising about 20 to about 30% of a mixture of waxes, said wax mixture containing about 30 to about 45% mineral waxes, a hydrocarbon solvent, about 1 to about 5% of a fatty acid ester of a polyhydric alcohol containing at least two free hydroxyl groups in the alcohol residue thereof, and the fatty acid substituent containing at least 12 carbon atoms, about 2 to about 15% of a thermoplastic synthetic resin soluble in said hydrocarbon solvent and selected from the group consisting of beta pinene resins, terpene phenolic resins, coumarone-indene resins and polystyrene resins, and a phosphatide.

6. A wax paste polish comprising about 20 to about 30% of a mixture of waxes, said wax mixture containing about 30 to about 45% mineral waxes, a hydrocarbon solvent, about 1 to about 5% of a monoglyceride of a fatty acid having at least 12 carbon atoms, about 2 to about 15% of a thermoplastic synthetic resin soluble in said hydrocarbon solvent and selected from the group consisting of beta pinene resins, terpene phenolic resins, coumarone-indene resins and polystyrene resins, and about 0.03 to about 1% of a phosphatide.

7. The composition of claim 6 wherein the monoglyceride is a monostearin of at least 90% purity.

8. The composition of claim 5 wherein the hydrocarbon solvent is selected from the group consisting of turpentines and mineral spirits, and the phosphatide is present in an amount of about 0.03 to about 1%.

9. A process which comprises combining a mixture of waxes containing about 30 to about 45% mineral waxes in a quantity such that the waxes constitute about 20 to about 30% of the finished composition, an acid ester of a polyhydric alcohol containing at least two free hydroxyl groups in the alcohol residue thereof and of a fatty acid containing at least 12 carbon atoms in a quantity to provide a finished composition containing about 1 to about 5% of the fatty acid ester, and a coal-tar dyestuff, heating the resultant mixture to melt the waxes, adding to the heated mixture a hydrocarbon solvent containing in solution a thermoplastic synthetic resin selected from the group consisting of beta pinene resins, terpene phenolic resins, coumarone-indene resins and polystyrene resins, in a quantity to provide that the synthetic resin constitutes about 2 to about 15% of the finished composition, and heating the total mass.

10. A process which comprises combining a mixture of waxes containing about 30 to about 45% mineral waxes in a quantity to provide that the waxes constitute about 20 to about 30% of the finished composition, an acid ester of a polyhydric alcohol containing at least two free hydroxyl groups in the alcohol residue thereof and of a fatty acid containing at least 12 carbon atoms in a quantity sufficient to provide that the fatty acid ester constitutes about 1 to about 5% of the finished composition, and a coal-tar dyestuff, heating the resultant mixture to a temperature of about 104 to about 121° C. with stirring, cooling the heated mixture to a temperature of about 90 to about 93° C., adding a phosphatide to said cooled mixture, cooling the phosphatide containing mixture to a temperature of about 80 to about 83° C., adding to said cooled phosphatide containing mixture a hydrocarbon solvent containing in solution a thermoplastic synthetic resin selected from the group consisting of beta pinene resins, terpene phenolic resins, coumarone-indene resins and polystyrene resins, in a quantity such that the resin constitutes about 2 to about 15% of the finished composition, cooling the total mass to a temperature of about 43 to about 52° C. and then reheating the cooled total mass to a temperature of about 52 to about 57° C.

References Cited in the file of this patent

UNITED STATES PATENTS

| | | |
|---|---|---|
| 2,114,490 | Harris | Apr. 19, 1938 |
| 2,201,064 | Thurman | May 14, 1940 |
| 2,320,236 | Hogg | May 25, 1943 |
| 2,355,061 | Eichberg | Aug. 8, 1944 |
| 2,561,816 | Pabst | July 24, 1951 |

FOREIGN PATENTS

| | | |
|---|---|---|
| 411,860 | Great Britain | June 13, 1934 |